(12) United States Patent
Liu

(10) Patent No.: US 12,065,820 B2
(45) Date of Patent: Aug. 20, 2024

(54) DRAINING DEVICE

(71) Applicant: SHANGHAI BIAOPU INDUSTRIAL CO., LTD., Shanghai (CN)

(72) Inventor: Yulong Liu, Shanghai (CN)

(73) Assignee: Shanghai Biaopu Industrial Co., Ltd., Shanghai (CN)

( * ) Notice: Subject to any disclaimer, the term of this patent is extended or adjusted under 35 U.S.C. 154(b) by 802 days.

(21) Appl. No.: 17/266,719

(22) PCT Filed: Aug. 8, 2019

(86) PCT No.: PCT/CN2019/099705
§ 371 (c)(1),
(2) Date: Feb. 8, 2021

(87) PCT Pub. No.: WO2020/030023
PCT Pub. Date: Feb. 13, 2020

(65) Prior Publication Data
US 2021/0301951 A1    Sep. 30, 2021

(30) Foreign Application Priority Data

Aug. 8, 2018  (CN) ......................... 201810896415.X

(51) Int. Cl.
*F16L 55/24*       (2006.01)
*E03F 1/00*        (2006.01)
*E03F 3/04*        (2006.01)
*E03F 5/04*        (2006.01)
*F16L 11/04*       (2006.01)

(52) U.S. Cl.
CPC ............... *E03F 1/002* (2013.01); *E03F 3/04* (2013.01); *E03F 5/04* (2013.01)

(58) Field of Classification Search
CPC .. F16L 9/14; F16L 57/00; F16L 11/111; E03F 1/002
See application file for complete search history.

(56) References Cited

FOREIGN PATENT DOCUMENTS

| CN | 2591093 Y | 12/2003 |
|---|---|---|
| CN | 201027346 Y | 2/2008 |
| CN | 201165702 Y | 12/2008 |

(Continued)

OTHER PUBLICATIONS

China National Intellectual Property Administration, International Search Report with Written Opinion, issued in PCT/CN2019/099705, Oct. 21, 2019, 17 pages, China National Intellectual Property Administration, Beijing, China.

(Continued)

*Primary Examiner* — Bradley R Spies
(74) *Attorney, Agent, or Firm* — Marshall & Melhorn, LLC

(57) ABSTRACT

A draining device, which can discharge permeated water and/or rainwater quickly, and adapt to different construction requirements is provided. The draining device may have a permeable wall body. The permeable wall body may have a plurality of ribs, where a cross section of the ribs in a first direction is wavy, and a wave amplitude of the cross section gradually changes, from a first side to a second side, in a second direction. Therefore, the ribs have alternating wave crest parts and wave trough parts at either side of the first direction. The wave crest part of one rib, among two adjacent ribs is opposite to the wave trough part of the other. The first direction intersects the second direction. The second direction is a thickness direction of the permeable wall body.

20 Claims, 10 Drawing Sheets

(56) References Cited

FOREIGN PATENT DOCUMENTS

| | | |
|---|---|---|
| CN | 202610946 U | 12/2012 |
| CN | 203977545 U | 12/2014 |
| CN | 105924928 A | 9/2016 |
| CN | 208594612 U | 3/2019 |
| CN | 208634254 U | 3/2019 |
| FR | 2205076 A5 | 5/1974 |
| JP | H0932094 A | 2/1997 |
| JP | 2002302995 A | 10/2002 |
| KR | 20110007013 U | 7/2011 |
| WO | 2017081462 A1 | 5/2017 |

OTHER PUBLICATIONS

International Bureau of WIPO, International Preliminary Report on Patentability, issued in PCT/CN2019/099705, Feb. 9, 2021, 12 pages, International Bureau of WIPO, Geneva, Switzerland.
The State Intellectual Property Office of People's Republic of China, Office Action in Application No. CN201810896415.X, dated May 18, 2024, 12 pages.

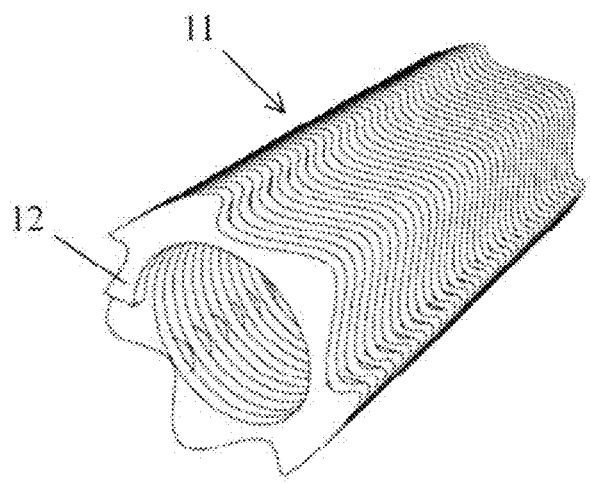
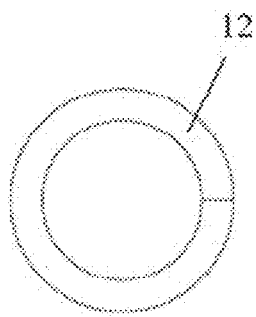
FIG.1A FIG.1B
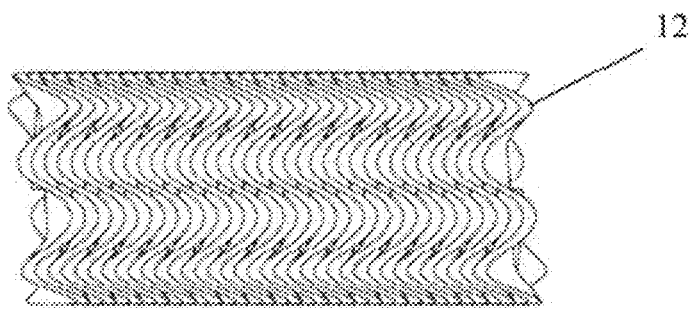
FIG.1C
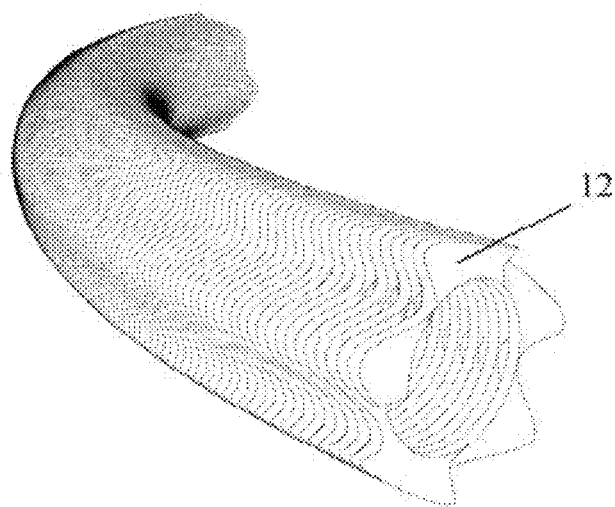
FIG.2

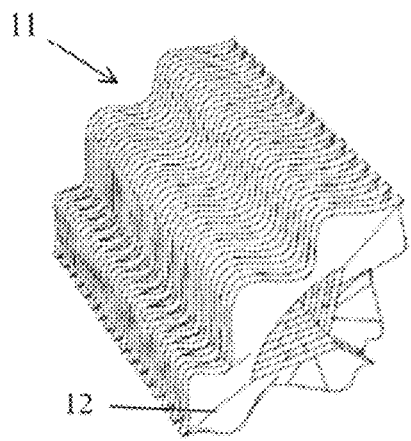
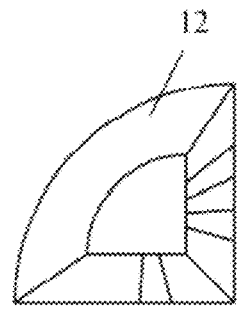
FIG.5A  FIG.5B
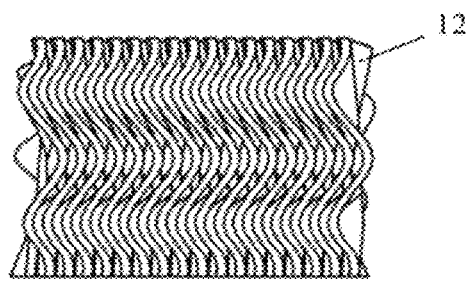
FIG.5C
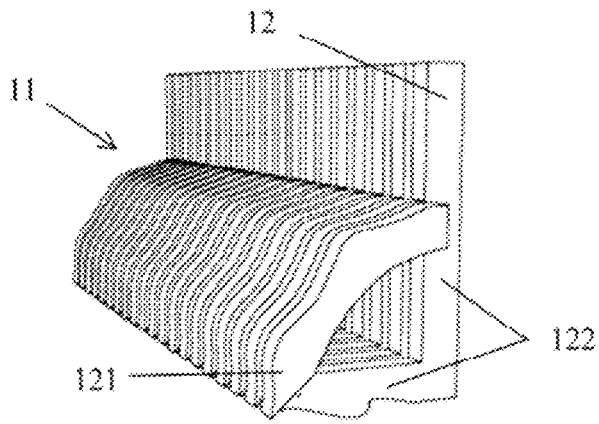
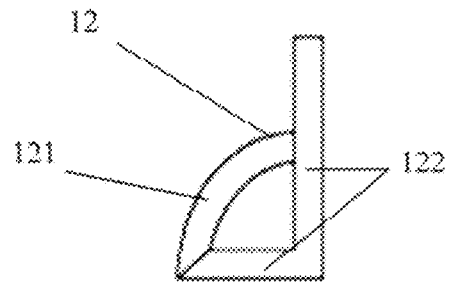
FIG.6A  FIG.6B
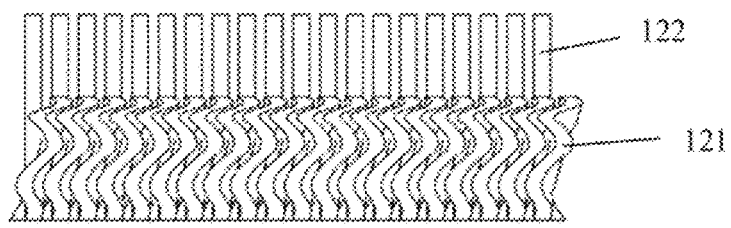
FIG.6C

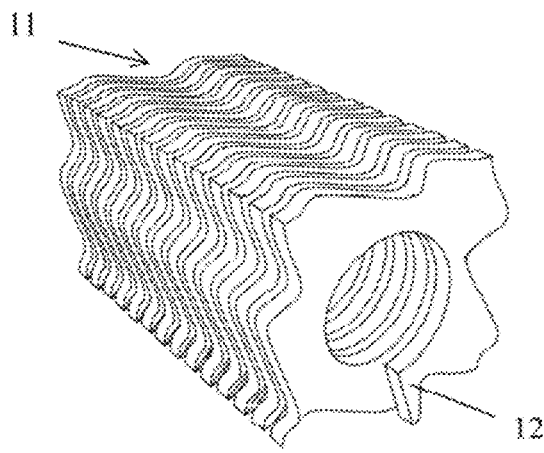
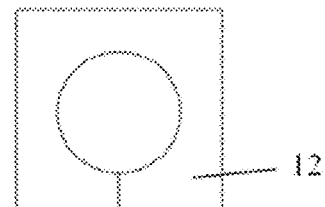
FIG.7A          FIG.7B
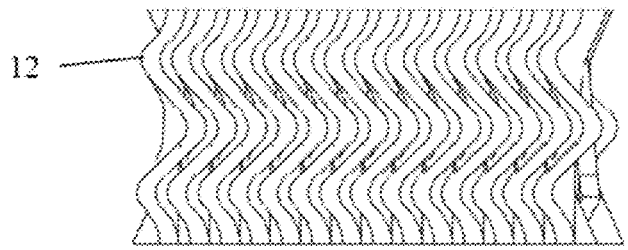
FIG.7C
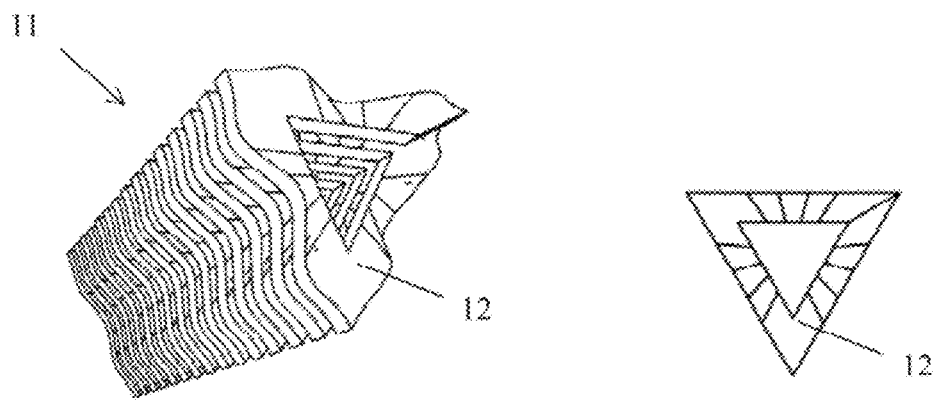
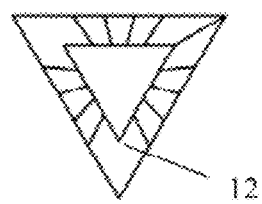
FIG.8A          FIG.8B
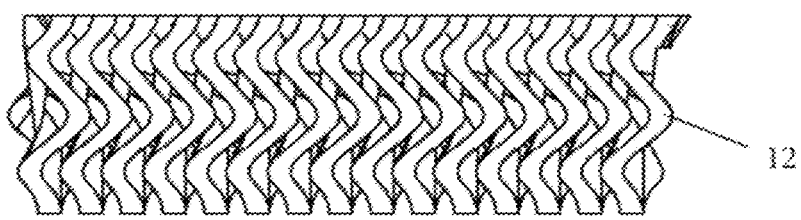
FIG.8C

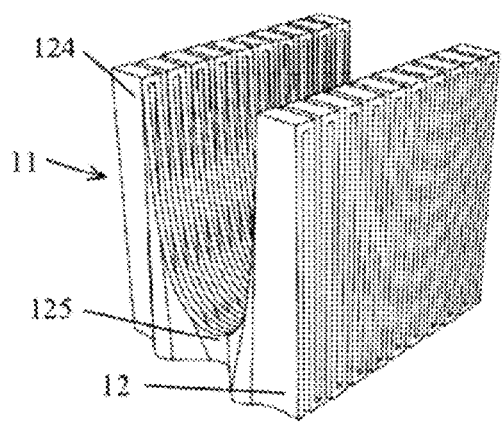
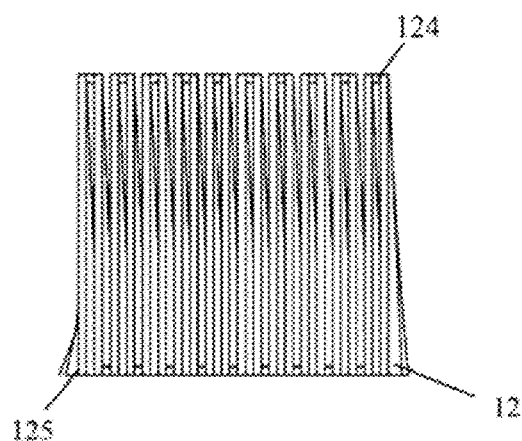
FIG.11A          FIG.11B
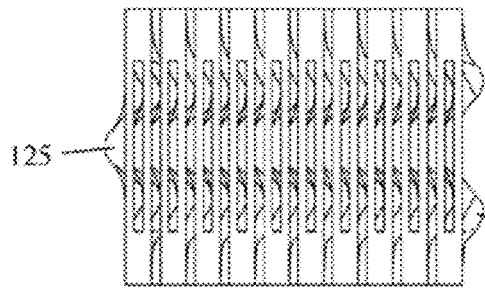
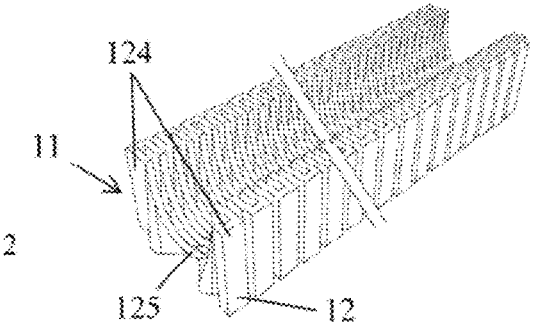
FIG.11C          FIG.11D
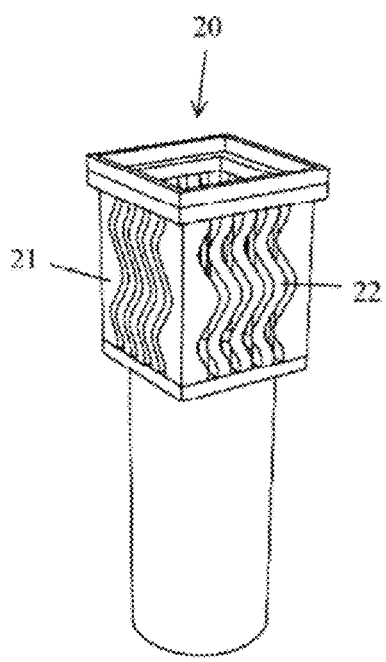
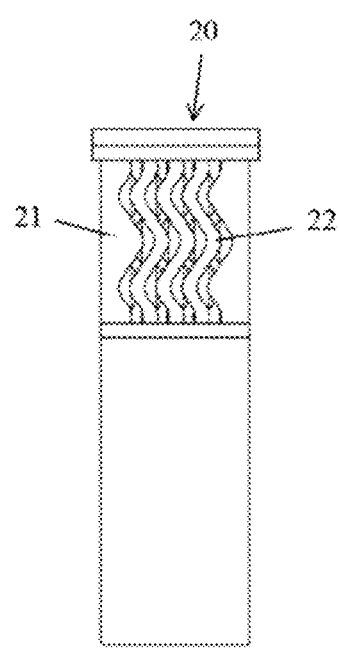
FIG.12A          FIG.12B

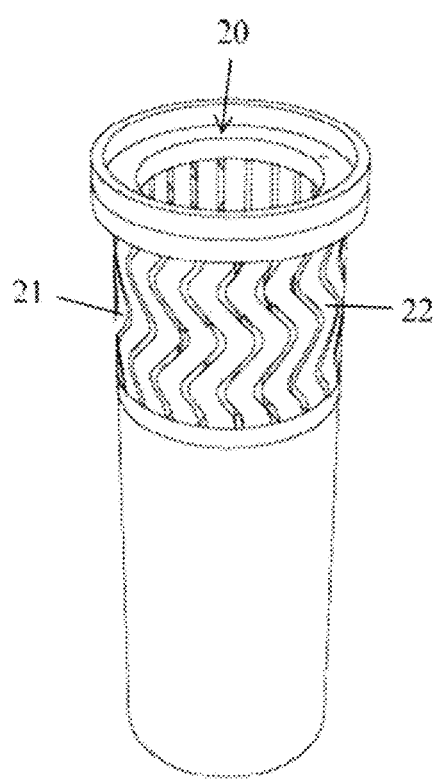 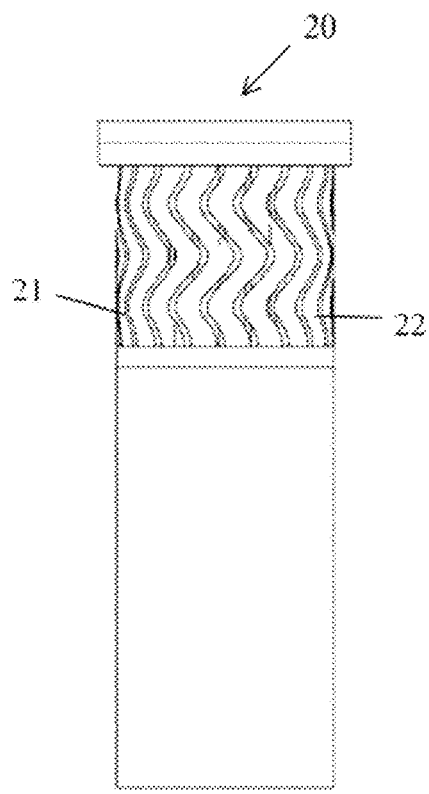
FIG.13A  FIG.13B
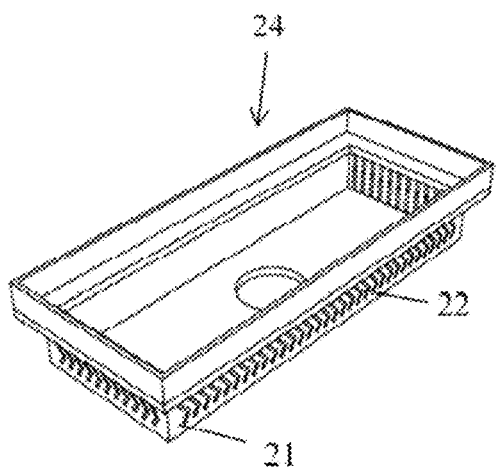 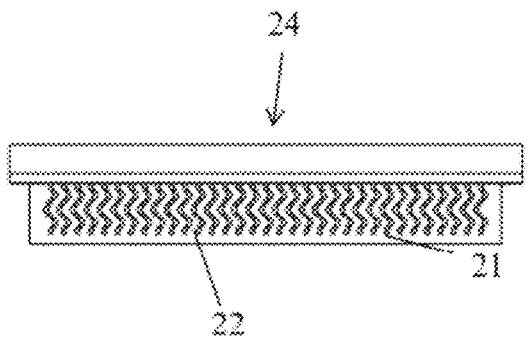
FIG.14A  FIG.14B

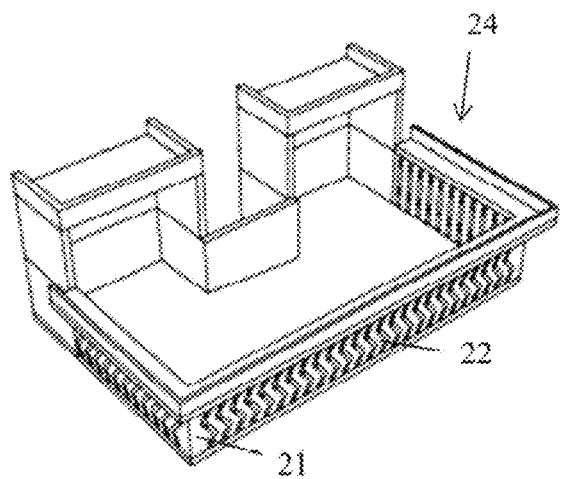
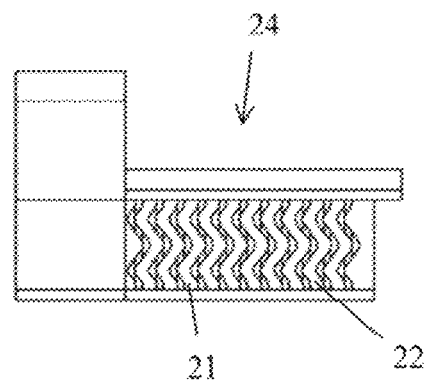
FIG.15A　　　　　　　FIG.15B
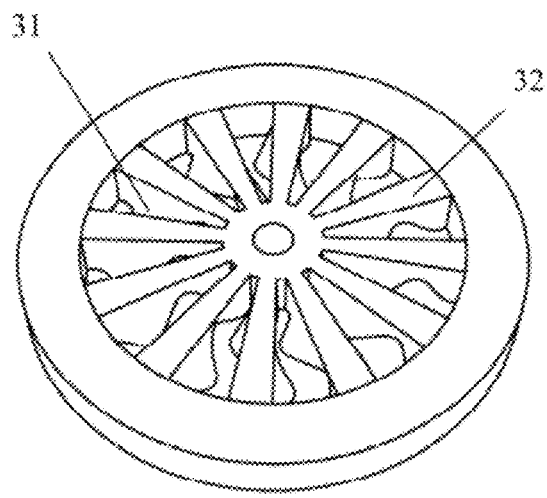
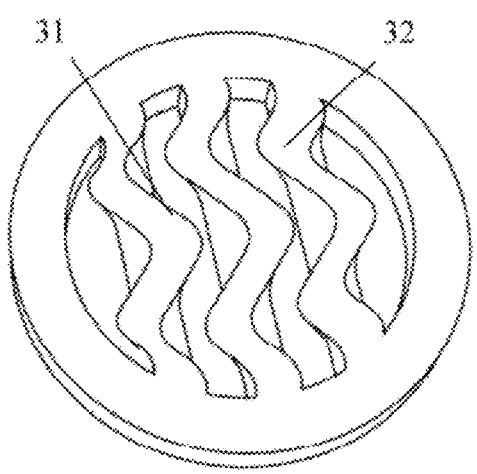
FIG.16　　　　　　　FIG.17

DRAINING DEVICE

TECHNICAL FIELD

The present invention relates to a draining device.

BACKGROUND

In order to discharge permeated water and/or rainwater quickly, the existing permeating and draining devices mainly comprise draining pipes, draining ditches, well boxes of collecting wells and well covers.

The existing draining pipes are mainly divided into products such as gravel blind ditches, plastic blind ditches, soft permeating pipes, and a plurality kinds of perforated pipes, etc. Wherein, the gravel blind ditch is made of a geotextile wrapped with gravels, which has low porosity, as well as shortcomings such as poor draining effect and easy blockage, etc.

The plastic blind ditches comprise circular pipes, circular reinforced pipes, rectangular pipes, rectangular reinforced pipes, circular solid pipes and square solid pipes. However, the plastic blind ditch also has some shortcomings, such as inflexible, not resistant to high temperature, and narrow draining channel, etc. The soft permeating pipe is supported by a sparse spring pipe in the middle, and coated with non-woven polyester fibre as a filter layer. Although the soft permeating pipe is flexible, it is not resistant to high temperature and has a poor compression performance. Meanwhile, the spring skeleton which plays a supporting role in the permeating pipe is also easy to lose its function due to a corrosion. The plurality kinds of perforated pipes are drilled on the pipe walls to form percolating and draining holes. A small part of the products, such as single wall corrugated pipes, are flexible. However, the draining effect of a perforated pipe with a low drilling rate is poor, while the compression performance of a pipe with a high drilling rate is poor. Meanwhile, the secondary processing of the pipe bodies will also increase some unnecessary costs, such as portage cost, transportation cost and drilling cost, etc.

The existing draining ditches are mainly divided into resin concrete draining ditches and HDPE finished draining ditches. The sidewalls of these two kinds of draining ditches are impermeable walls. In order to make the walls permeable, secondary drilling is needed on the sidewalls. There are also some problems, such as the poor draining effect of a wall with a low drilling rate, the poor compression performance of a wall with a high drilling rate, and the additional cost of the secondary processing. Additionally, neither of these two kinds of draining ditches is flexible. For the HDPE finished draining ditch, it also has some shortcomings, such as the poor compression performance and the poor resistance to high temperature, etc., which affect its application. For the resin concrete draining ditch, its wall is thick, which makes the draining channel small, thus affecting the draining effect. In addition, the resin concrete draining ditch is bulky, which is very difficult to handle and install.

The existing well boxes for water collecting wells are mainly divided into two kinds, comprising iron sheet well boxes and ductile iron well boxes. Wherein, the compression performance of the iron sheet well boxes are poor. Meanwhile, box bodies of the iron sheet well boxes and the ductile iron well boxes generally do not have permeating and draining holes. A secondary drilling process is also needed if an increase of permeating and draining holes is needed to improve the draining efficiency, which also has some problems, such as the poor draining effect of a wall with a low drilling rate, the poor compression performance of a wall with a high drilling rate, and the additional cost of the secondary processing.

The existing well covers mainly comprise grid type well covers, well covers with circular drain holes, and gap type well covers, which are matched and used with the finished draining ditches and the well boxes of the collecting wells. The draining channels of these well covers are generally straight up and down, having a shortcoming of easy blockage.

SUMMARY

The object of the present invention is to provide a draining device, which can discharge permeated water and/or rainwater quickly, and adapt to different construction requirements.

A draining device comprises a permeable wall body. The permeable wall body comprises a plurality of ribs, wherein a cross section of the ribs in a first direction is wavy, and a wave amplitude of the cross section gradually changes, from a first side to a second side, in a second direction. Therefore, the ribs have alternating wave crest parts and wave trough parts at either side of the first direction. The wave crest part of one rib, among two adjacent ribs, is opposite to the wave trough part of the other. The first direction intersects the second direction. The second direction is a thickness direction of the permeable wall body.

The 1st additional feature of the draining device is that in an orthographic projection of the permeable wall body, along its vertical direction, a surface of the one of the adjacent ribs at the first side overlaps a surface of the other of the adjacent ribs at the second side.

The 2nd additional feature of the draining device is that the wave amplitude of a wall surface at the first side, or a wall surface at the second side, is 0.

The 3rd additional feature of the draining device is that the draining device is made of plastic material.

The 4th additional feature of the draining device is that the draining device is a draining pipe or a draining ditch, the draining pipe or the draining ditch is tubular, the first direction is a circumferential direction of the draining pipe or the draining ditch, and the second direction is a radial direction of the draining pipe or the draining ditch.

The 5th additional feature of the draining device is that on the basis of the 4th additional feature, the permeable wall body of the draining pipe or the draining ditch is composed of a plurality of ribs, connected into a whole by heads and tails in a spiral shape, an inner side of the draining pipe or the draining ditch is the first side, and an outer side of the draining pipe or the draining ditch is the second side.

The 6th additional feature of the draining device is that on the basis of the 5th additional feature, when viewed from an axial direction, the draining device is divided into two parts in up and down directions, each of which has a linear sidewall, the wave amplitude of the outer surface of the linear sidewall of one part, among the two parts, is 0, and the wave amplitude of the outer surface of the linear sidewall of the other part, among the two parts, is largest during the gradual changing process.

The 7th additional feature of the draining device is that on the basis of the 5th additional feature, two opposite ends of any adjacent ribs are connected by at least one reinforcing rib.

The 8th additional feature of the draining device is that on the basis of the 5th additional feature, the reinforcing ribs are arranged in a manner, in which any one of the reinforcing ribs is arranged in an angle manner or a parallel staggered manner that is relative to its adjacent reinforcing rib, in the draining device.

The 9th additional feature of the draining device is that on the basis of the 5th additional feature, any adjacent ribs of the plurality of ribs are connected in an elastically expandable manner to make the draining pipe or the draining ditch easy to expand and bend.

The 10th additional feature of the draining device is that on the basis of the 5th additional feature, when viewed from an axial direction of the draining pipe or the draining ditch, the draining pipe or the draining ditch is circular.

The 11th additional feature of the draining device is that on the basis of the 5th additional feature, an inner sidewall surface of the plurality of ribs is cylindrical, and an outer sidewall surface is wavy on the cylinder surface.

The 12th additional feature of the draining device is that on the basis of the 5th additional feature, an outer sidewall surface of the plurality of ribs is cylindrical, and an inner sidewall surface is wavy on the cylinder surface.

The 13th additional feature of the draining device is that on the basis of the 5th additional feature, an inner sidewall surface of the draining pipe or the draining ditch is rectangular-cylinder shaped, and an outer sidewall surface is wavy on the rectangular-cylinder surface.

The 14th additional feature of the draining device is that on the basis of the 5th additional feature, an outer sidewall surface of the draining pipe or the draining ditch is rectangular-cylinder shaped, and an inner sidewall surface is wavy on the rectangular-cylinder surface.

The 15th additional feature of the draining device is that on the basis of the 5th additional feature, an inner sidewall surface of the draining pipe or the draining ditch is flabellate-cylinder shaped, and an outer sidewall surface is wavy on the flabellate-cylinder surface.

The 16th additional feature of the draining device is that on the basis of the 5th additional feature, an outer sidewall surface of the draining pipe or the draining ditch is flabellate-cylinder shaped, and an inner sidewall surface is wavy on the flabellate-cylinder surface.

The 17th additional feature of the draining device is that on the basis of the 15th additional feature, when viewed from an axial direction of the draining pipe or the draining ditch, the draining pipe or the draining ditch is flabellate, comprising an arc wall and two radial walls, one of the radial walls protrudes from the arc wall.

The 18th additional feature of the draining device is that on the basis of the 16th additional feature, when viewed from an axial direction of the draining pipe or the draining ditch, the draining pipe or the draining ditch is flabellate, comprising an arc wall and two radial walls, one of the radial walls protrudes from the arc wall.

The 19th additional feature of the draining device is that on the basis of the 5th additional feature, an inner sidewall surface of the draining pipe or the draining ditch is cylindrical, and an outer sidewall surface is wavy on the cylinder surface.

The 20th additional feature of the draining device is that on the basis of the 5th additional feature, an outer sidewall surface of the draining pipe or the draining ditch is cylindrical, and an inner sidewall surface is wavy on the cylinder surface.

The 21st additional feature of the draining device is that on the basis of the 5th additional feature, an inner sidewall surface of the draining pipe or the draining ditch is triangular-cylinder shaped, and an outer sidewall surface is wavy on the triangular-cylinder surface.

The 22nd additional feature of the draining device is that on the basis of the 5th additional feature, an outer sidewall surface of the draining pipe or the draining ditch is triangular-cylinder shaped, and an inner sidewall surface is wavy on the triangular-cylinder surface.

The 23rd additional feature of the draining device is that on the basis of the 5th additional feature, an inner sidewall surface of the draining pipe or the draining ditch is trapezoidal-cylinder shaped, and an outer sidewall surface is wavy on the trapezoidal-cylinder surface.

The 24th additional feature of the draining device is that on the basis of the 5th additional feature, an outer sidewall surface of the draining pipe or the draining ditch is trapezoidal-cylinder shaped, and an inner sidewall surface is wavy on the trapezoidal-cylinder surface.

The 25th additional feature of the draining device is that the draining device is a draining ditch, the ribs are U-shaped, having two side-arms and a bottom, the adjacent ribs of the plurality of ribs are alternately connected at top ends of the two side-arms and the bottom, or at opposite side-arms, the bottom of the rib has the wave shape, the first direction is a length extension direction of the draining ditch; any adjacent ribs of the plurality of ribs are connected in an elastically expandable manner to make the draining ditch easy to expand and bend.

The 26th additional feature of the draining device is that the draining device is an anti-blocking and water-permeating collecting well, a well wall of the anti-blocking and water-permeating collecting well comprises the permeable wall body.

The 27th additional feature of the draining device is that on the basis of the 26th additional feature, the anti-blocking and water-permeating collecting well is square or circular, four surrounding well walls near a wellhead are the permeable wall bodies.

The 28th additional feature of the draining device is that on the basis of the 26th additional feature, the anti-blocking and water-permeating collecting well is a water collecting box or an L-shape, three sidewalls are respectively the permeable wall bodies.

The 29th additional feature of the draining device is that the draining device is an anti-blocking well cover.

The 30th additional feature of the draining device is that on the basis of the 29th additional feature, the anti-blocking well cover is circular, rectangular or L-shaped, the plurality of ribs extend radially from a centre of the anti-blocking well cover to a periphery, or between two opposite sides.

The 31st additional feature of the draining device is that on the basis of the 29th additional feature, the anti-blocking well cover is composed of the plurality of ribs, the adjacent ribs of the plurality of ribs are alternately connected at both ends, the first direction is a length extension direction of the anti-blocking well cover; any adjacent ribs of the plurality of ribs are connected in an elastically expandable manner to make the anti-blocking well cover easy to expand and bend.

The 32nd additional feature of the draining device is that on the basis of any one feature of the 1st~31st additional features, the first side or the second side of at least a part of the plurality of ribs is connected by a reinforcing rib.

The 33rd additional feature of the draining device is that on the basis of any one feature of the 1st~31st additional features, at least a part of the plurality of ribs is provided with a hole or a groove to form an additional draining channel.

The 34th additional feature of the draining device is that on the basis of any one feature of the 1st~31st additional features, the draining device also comprises a filter layer that is wrapped outside the permeable wall body.

The beneficial effect of the present invention is that a draining device, the permeable wall body of which comprises a plurality of ribs, is provided, and a draining device capable of drainage and anti-blocking is provided without affecting the structural stability of the draining device. Meanwhile, the present invention can be applied to different construction occasions, so as to improve the production efficiency and save the construction cost.

BRIEF DESCRIPTION OF THE DRAWINGS

The specific features and performance of the present invention are further given by the following embodiments and the figures thereof.

FIG. 1A is a three-dimensional schematic diagram of an embodiment of the draining pipe or the draining ditch.

FIG. 1B is a side view of the draining pipe or the draining ditch shown in FIG. 1A.

FIG. 1C is an elevation view of the draining pipe or the draining ditch shown in FIG. 1A.

FIG. 2 is a three-dimensional schematic diagram of another embodiment of the draining pipe or the draining ditch.

FIG. 5A is a three-dimensional schematic diagram of another embodiment of the draining pipe or the draining ditch.

FIG. 5B is a side view of the draining pipe or the draining ditch shown in FIG. 5A.

FIG. 5C is an elevation view of the draining pipe or the draining ditch shown in FIG. 5A.

FIG. 6A is a three-dimensional schematic diagram of another embodiment of the draining pipe or the draining ditch.

FIG. 6B is a side view of the draining pipe or the draining ditch shown in FIG. 6A.

FIG. 6C is an elevation view of the draining pipe or the draining ditch shown in FIG. 6A.

FIG. 7A is a three-dimensional schematic diagram of another embodiment of the draining pipe or the draining ditch.

FIG. 7B is a side view of the draining pipe or the draining ditch shown in FIG. 7A.

FIG. 7C is an elevation view of the draining pipe or the draining ditch shown in FIG. 7A.

FIG. 8A is a three-dimensional schematic diagram of another embodiment of the draining pipe or the draining ditch.

FIG. 8B is a side view of the draining pipe or the draining ditch shown in FIG. 8A.

FIG. 8C is an elevation view of the draining pipe or the draining ditch shown in FIG. 8A.

FIG. 11A is a three-dimensional schematic diagram of another embodiment of the draining ditch.

FIG. 11B is a side view of the draining ditch shown in FIG. 11A.

FIG. 11C is an elevation view of the draining ditch shown in FIG. 11A.

FIG. 11D is a three-dimensional schematic diagram of another embodiment of the draining ditch.

FIG. 12A is a three-dimensional schematic diagram of an embodiment of the anti-blocking and water-permeating collecting well.

FIG. 12B is an elevation view of the anti-blocking and water-permeating collecting well shown in FIG. 12A.

FIG. 13A is a three-dimensional schematic diagram of another embodiment of the anti-blocking and water-permeating collecting well.

FIG. 13B is an elevation view of the anti-blocking and water-permeating collecting well shown in FIG. 13A.

FIG. 14A is a three-dimensional schematic diagram of another embodiment of the anti-blocking and water-permeating collecting well.

FIG. 14B is an elevation view of the anti-blocking and water-permeating collecting well shown in FIG. 14A FIG. 15A is a three-dimensional schematic diagram of another embodiment of the anti-blocking and water-permeating collecting well.

FIG. 15B is an elevation view of the anti-blocking and water-permeating collecting well shown in FIG. 15A FIG. 16 to FIG. 21 are three-dimensional schematic diagrams of a plurality of embodiments of the anti-blocking well cover.

DETAILED DESCRIPTION OF EMBODIMENTS

Figure 3A:
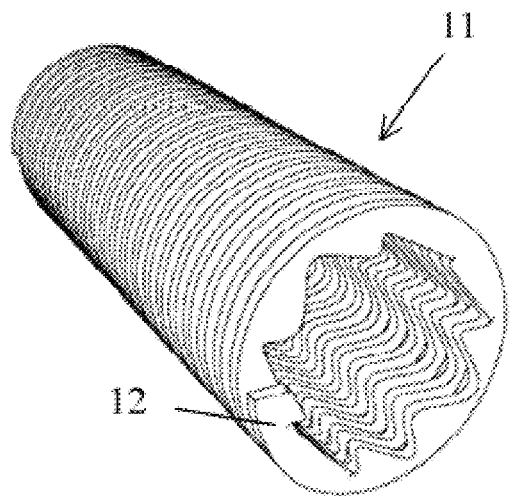
FIG. 3A is a three-dimensional schematic diagram of another embodiment of the draining pipe or the draining ditch.

A plurality of implementation manners or embodiments to implement the mentioned subject technical proposal are disclosed below. In order to simplify the disclosure, specific examples of each element and arrangement are described below. Deservedly, these descriptions are only examples, not limiting the protection scope of the present invention. For example, the description that a first feature is formed above or on a second feature, described following, may comprise an embodiment in which the first feature and the second feature are formed by a direct contact, or an embodiment in which an additional feature is formed between the first feature and the second feature, so that the first feature and the second feature may not be directly connected. Additionally, reference numerals and/or letters may be repeated in different examples in these disclosures. The repetition is for the sake of brevity and clarity, not indicating the relationship between the various embodiments and/or structures to be discussed. Further, when a first element is described in a manner of connecting or combining with a second element, the description comprises an embodiment in which the first element and the second element are directly connected or combined with each other, as well as an embodiment in which one or more other intervening elements are added to make the first element and the second element indirectly connected or combined with each other.

In a plurality of embodiments of the draining device, the draining device may be a draining pipe, a draining ditch, an anti-blocking and water-permeating collecting well, or an anti-blocking well cover.

FIG. 1A to FIG. 10 show a plurality of embodiments of the draining device. In these embodiments, the draining device is a draining pipe, which is mainly used in asphalt interlayer water drainage and other drainage areas, such as: vertical and horizontal drainage on the back surfaces of various retaining walls; highway, railway subgrade, shoulder and soft soil foundation drainage; tunnel and underground drainage; power ash dam and water conservancy dam drainage; highway central isolation belt drainage and vegetation protection;

outdoor sports ground drainage; horizontal drilled hole drainage; collapsible slippery ground drainage for slope protection; roof garden and flower terrace drainage; roof drainage of an underground garage; hillside drainage; underground drainage for a ground flattening project, low-lying land drainage, and a saline-alkali land reconstruction system, etc., for replacing the soft permeating pipes, the plastic blind ditches and the various perforated pipes, etc. Meanwhile, FIG. 1A to FIG. 10 provide draining pipes in various shapes to meet the requirements of compression and draining amount, etc., under different construction conditions.

Please referring to FIG. 1A to FIG. 1C for details, in one embodiment of the draining pipe, the draining pipe comprises a plurality of ribs 12. The plurality of ribs 12 are connected into a whole by heads and tails in a spiral shape, composing a tubular permeable wall body 11 of the draining pipe. It can be known from the contents shown in FIG. 1B and FIG. 1C, when viewed from an axial direction of the draining pipe, the draining pipe is circular. Besides, a cross section of the ribs 12 is wavy in a circumferential direction of the draining pipe, and has alternating wave crest parts and wave trough parts at an outer side of the circumferential direction, wherein the wave crest part of one rib, among two adjacent ribs, is opposite to the wave trough part of the other. The wave amplitude of the wavy section decreases gradually from the outer side to the inner side of the draining pipe, along a radial direction of the draining pipe, and decreases to 0 at the inner side of the draining pipe, so that the inner sidewall surface of the plurality of ribs 12 is cylindrical, and the outer sidewall surface is wavy on the surface of the cylinder. In an orthographic projection of the permeable wall body 11, along a vertical direction thereof, an inner surface of one rib, among the adjacent ribs, overlaps an outer surface of the other rib, among the adjacent ribs, so that when viewed along the vertical direction of the permeable wall body 11 of the draining pipe, the gaps on the surface of the permeable wall body 11 of the draining pipe are shielded by the inner and outer surfaces of the plurality of ribs 12. Therefore, debris outside the draining pipe are not easy to enter into the draining pipe from the gaps on the permeable wall body 11 to block the draining pipe. The draining performance is not affected, meanwhile, an anti-blocking effect is reached in the draining pipe. Meanwhile, when the draining pipe is buried beneath road surface, the outer sidewall surface of the plurality of ribs 12 of the draining pipe can be more closely bonded with the material buried outside the draining pipe. Meanwhile, in the case of the same wall thickness, more raw materials can be save, and in the case of the same diameter, a longer pipe can be produced, making the construction more portable and more environmental friendly.

In one embodiment, the draining pipe is made of plastic material, and the molding method thereof may be, but is not limited to, injection molding, extrusion molding and other suitable plastic molding processes, so that the draining pipe is not easy to be corroded during the application process. Moreover, the plastic draining pipe can be disconnected by scissors or artistic knife, therefore, a plastic draining pipe with the same diameter will be more portable and more convenient for handling and construction. Meanwhile, when a plastic draining pipe is used in an asphalt pavement, the plastic draining pipe can be reused as a part of asphalt mixture when the asphalt surface is damaged and needs milling. In one embodiment, the draining pipe is made by the rotation of a nozzle. A spring pipe with an inner diameter of 15 mm can be made with a longest length of 120 m. Meanwhile, the larger the diameter is, the shorter the spring pipe is. However, a spring pipe with a diameter of 45 mm can be made with a length of 30 m. Therefore, fewer joints are needed to be connected, so that the construction quality is more guaranteed. In another embodiment, the draining pipe may also be made of metal material.

In some embodiments, the plurality of ribs 12 of a plurality of draining pipes can be connected by welding, bonding or buckles.

As shown in FIG. 2, in one embodiment, any adjacent ribs of the plurality of ribs 12 in the draining pipe are connected in an elastically expandable manner, so that the draining pipe is easy to expand and bend. When applied in occasions with various construction directions, the flexible draining pipe can be more closely connected with the construction road directions, which can reduce the gap between the draining pipe and the building or road, improving the drainage efficiency, as well as preventing garbage and other debris from accumulating in the gap between the draining pipe and the road.

Figure 3B:
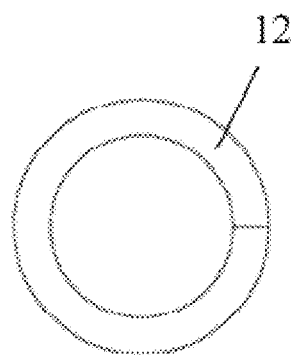
FIG. 3B is a side view of the draining pipe or the draining ditch shown in FIG. 3A.
Figure 3C:
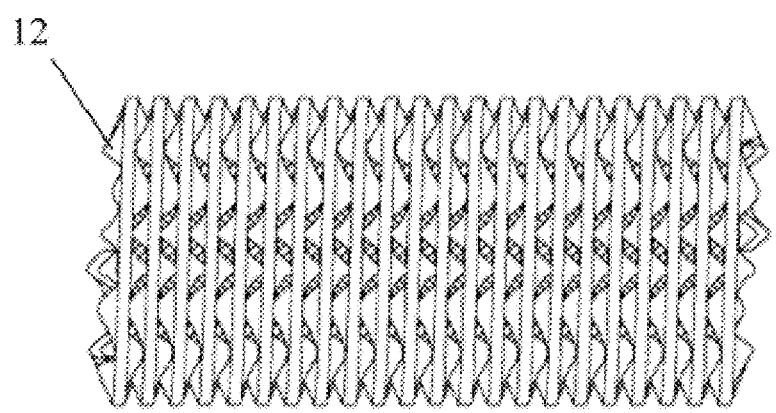
FIG. 3C is an elevation view of the draining pipe or the draining ditch shown in FIG. 3A.

The embodiment of the draining pipe shown in FIG. 1A to FIG. 1C also has a variant. As shown in FIGS. 3A to 3C, in the wavy section of the ribs 12 in a circumferential direction of the draining pipe, the wave amplitude thereof decreases gradually from the inner side to the outer side of the draining pipe, along the radial direction of the draining pipe, and decreases to 0 at the outer side of the draining pipe, so that the outer sidewall surface of the ribs 12 is cylindrical, and the inner sidewall surface is wavy on the surface of the cylinder. At this time, when observed along the vertical direction of the permeable wall body 11 of the draining pipe, the gaps on the surface of the permeable wall body 11 of the draining pipe will also be shielded by the inner and outer surfaces of the plurality of ribs 12, which can also reach the anti-blocking effect in the draining pipe.

Figure 4A:
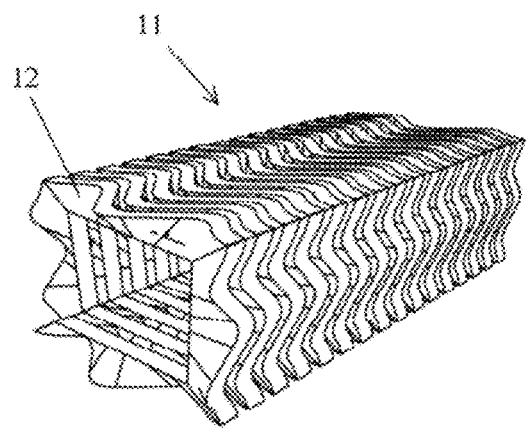
FIG. 4A is a three-dimensional schematic diagram of another embodiment of the draining pipe or the draining ditch.
Figure 4B:
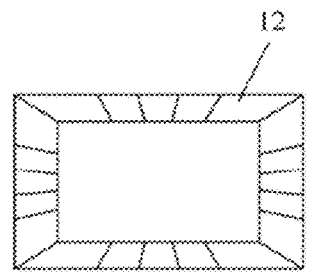
FIG. 4B is a side view of the draining pipe or the draining ditch shown in FIG. 4A.
Figure 4C:
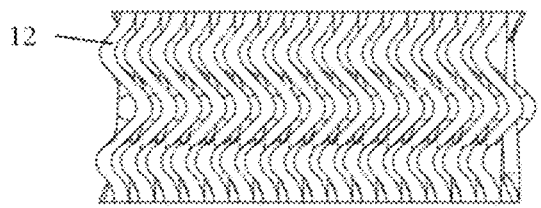
FIG. 4C is an elevation view of the draining pipe or the draining ditch shown in FIG. 4A.

As shown in FIGS. 4A to 4C, in another embodiment of the draining pipe, a plurality of ribs 12, composing a tubular permeable wall body 11 of the draining pipe, are connected into a whole by heads and tails in a spiral shape. Please referring to FIGS. 4B and 4C, when viewed along an axial direction of the draining pipe, the draining pipe is rectangular. Besides, a cross section of the ribs 12 is wavy in a circumferential direction of the draining pipe, and has alternating wave crest parts and wave trough parts at an outer side of the circumferential direction, wherein the wave crest part of one rib, among two adjacent ribs, is opposite to the wave trough part of the other. The wave amplitude of the wavy section decreases gradually from the outer side to the inner side of the draining pipe, along a radial direction of the draining pipe, and decreases to 0 at the inner side of the draining pipe, so that the inner sidewall surface of the plurality of ribs 12 is rectangular-cylinder shaped, and the outer sidewall surface is wavy on the surface of the rectangular-cylinder. The draining pipe, arranged in this implementation manner, can also reach the anti-blocking effect in the draining pipe, as that shown in FIG. 1A to FIG. 1C. Meanwhile, since the draining pipe is rectangular when viewed along the axial direction of the draining pipe, it will not roll along the circumferential direction when placed on a flat surface.

The draining pipe shown in FIG. 4A to FIG. 4C also has a variant. For example, in the wavy section of the ribs 12 in a circumferential direction of the draining pipe, the wave amplitude thereof decreases gradually from the inner side to the outer side of the draining pipe, along the radial direction of the draining pipe, and decreases to 0 at the outer side of the draining pipe, so that the outer sidewall surface of the ribs 12 is rectangular-cylinder shaped, and the inner sidewall surface is wavy on the surface of the rectangular-cylinder.

Figure 4D:
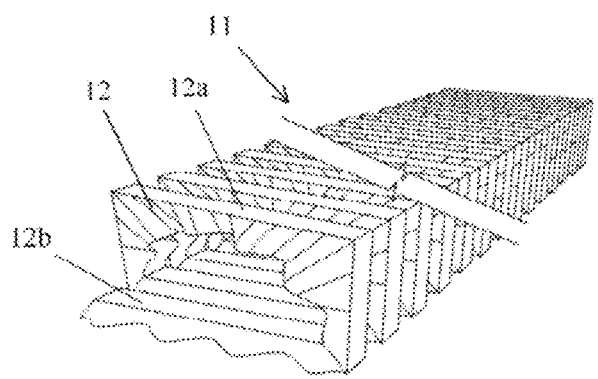
FIG. 4D is a three-dimensional schematic diagram of another embodiment of the draining pipe or the draining ditch.
Figure 4E:
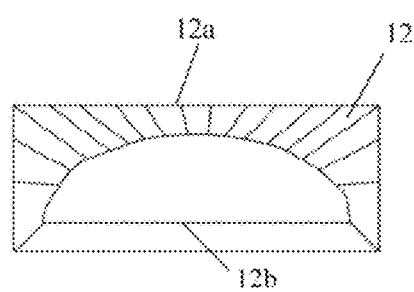
FIG. 4E is a side view of the draining pipe or the draining ditch shown in FIG. 4D.
Figure 4F:
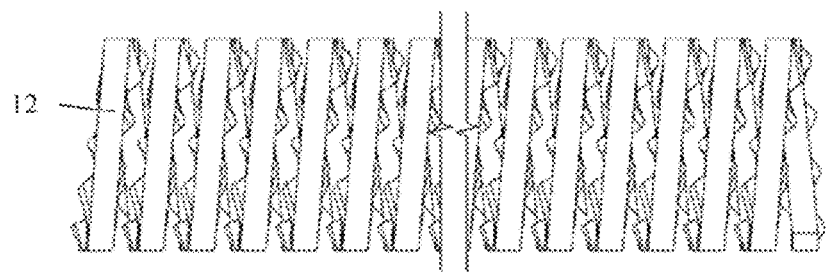
FIG. 4F is an elevation view of the draining pipe or the draining ditch shown in FIG. 4D.

As shown in FIGS. 4D to 4F, in another embodiment of the draining pipe, a plurality of ribs 12, composing a tubular permeable wall body 11 of the draining pipe, are connected into a whole by heads and tails in a spiral shape. When viewed along an axial direction of the draining pipe, a radial profile of the draining pipe is shown in FIG. 4E. An outer part of the draining pipe is rectangular, while an inner part thereof is arched. The draining pipe is divided into two parts in up and down directions, each of which has a linear sidewall 12a, 12b. The wave amplitude of the outer surface of the linear sidewall 12a in the upper part is 0, while the wave amplitude of the outer surface of the linear sidewall 12b in the lower part increases from the inner side to the outer side, and reaches the maximum value on the outer surface of the linear sidewall 12b. Wherein, the linear sidewall 12a may also be a linear sidewall in the lower part, while the corresponding linear sidewall 12b may be a linear sidewall in the upper part, so that the wave amplitude in the linear sidewall of the lower part is 0, and the wave amplitude reaches the maximum value on the outer surface of the linear sidewall of the upper part. The draining pipe designed in this manner not only has an anti-blocking function, but also has stronger bottom stability. Meanwhile, users can choose which type of sidewall to use as the upper surface according to their needs. The draining pipe shown in FIG. 4D to FIG. 4F also has a variant. For example, the outer profile of the draining pipe may be a suitable shape comprising but not limited to polygon, circle, arch, etc., which comprises at least one straight edge. For example, the inner profile of the draining pipe may also be a suitable shape comprising but not limited to polygon, circle, arch, etc.

As shown in FIGS. 5A to 5C, in another embodiment of the draining pipe, a plurality of ribs 12, composing a tubular permeable wall body 11 of the draining pipe, are connected into a whole by heads and tails in a spiral shape. Please referring to FIGS. 5B and 5C, when viewed along an axial direction of the draining pipe, the draining pipe is fan-shaped. Besides, a cross section of the ribs 12 is wavy in a circumferential direction of the draining pipe, and has alternating wave crest parts and wave trough parts at an outer side of the circumferential direction, wherein the wave crest part of one rib, among two adjacent ribs, is opposite to the wave trough part of the other. The wave amplitude of the wavy section decreases gradually from the outer side to the inner side of the draining pipe, along a radial direction of the draining pipe, and decreases to 0 at the inner side of the draining pipe, so that the inner sidewall surface of the plurality of ribs 12 is flabellate-cylinder shaped, and the outer sidewall surface is wavy on the surface of the flabellate-cylinder. The draining pipe, arranged in this implementation manner, can also reach the anti-blocking effect in the draining pipe, as that shown in FIG. 1A to FIG. 1C. Meanwhile, since the draining pipe is fan-shaped when viewed along the axial direction of the draining pipe, it will not roll along the circumferential direction when placed on a flat surface. In a plurality of embodiments, the draining pipe is fan-shaped when viewed along the axial direction of the draining pipe, and a central angle of the sector can be any value between 0° and 180°. Wherein, when the central angle of the sector is 90°, the draining pipe is a right angle sector when viewed along the axial direction of the draining pipe; when the central angle of the sector is 180°, the draining pipe is a semicircle when viewed along the axial direction of the draining pipe. In an embodiment, when viewed along the axial direction of the draining pipe, the draining pipe is a right angle sector, and when provided at an expansion joint position of a bridge, one right angle side thereof is close to the expansion joint, while the other right angle side is placed on the bridge floor, and the arc surface is facing the driving direction of a vehicle on the bridge. Since the arc surface will be firstly passed before the expansion joint being rolled, when a vehicle passes the expansion joint, the draining pipe can still maintain the structural stability of the pipe body after repeated rolling, due to the structural stability of the right angle sector. In another embodiment, the draining pipe is arched when viewed along the axial direction of the draining pipe.

The draining pipe shown in FIGS. 5A to 5C also has a variant. For example, in the wavy section of the ribs 12 in a circumferential direction of the draining pipe, the wave amplitude thereof decreases gradually from the inner side to the outer side of the draining pipe, along the radial direction of the draining pipe, and decreases to 0 at the outer side of the draining pipe, so that the outer sidewall surface of the ribs 12 is flabellate-cylinder shaped, and the inner sidewall surface is wavy on the surface of the flabellate-cylinder.

The draining pipe shown in FIGS. 5A to 5C also has another variant. As shown in FIGS. 6A to 6C, when viewed from an axial direction of the draining pipe, the draining pipe is fan-shaped, comprising an arc wall 121 and two radial walls 122, wherein one of the radial walls 122 protrudes from the arc wall 121. The wave amplitude of the wavy section of the ribs 12 decreases gradually from the outer side to the inner side of the draining pipe, along a radial direction of the draining pipe, and decreases to 0 at the inner side of the draining pipe. In another embodiment, the wave amplitude of the wavy section of the ribs 12 decreases gradually from the inner side to the outer side of the draining pipe, along the radial direction of the draining pipe, and decreases to 0 at the outer side of the draining pipe.

As shown in FIGS. 7A to 7C, in another embodiment of the draining pipe, a plurality of ribs 12, composing a tubular permeable wall body 11 of the draining pipe, are connected into a whole by heads and tails in a spiral shape. Please referring to FIGS. 7B and 7C, when viewed along an axial direction of the draining pipe, the draining pipe is square at the outer side and circular at the inner side. Besides, a cross section of the ribs 12 is wavy in a circumferential direction of the draining pipe, and has alternating wave crest parts and wave trough parts at an outer side of the circumferential direction, wherein the wave crest part of one rib, among two adjacent ribs, is opposite to the wave trough part of the other. The wave amplitude of the wavy section decreases gradually from the outer side to the inner side of the draining pipe, along a radial direction of the draining pipe, and decreases to 0 at the inner side of the draining pipe, so that the inner sidewall surface of the plurality of ribs 12 is cylindrical, and the outer sidewall surface is wavy on the surface of a rectangular-cylinder. The draining pipe, arranged in this implementation manner, can also reach the anti-blocking effect in the draining pipe, as that shown in FIG. 1A to FIG. 1C. Meanwhile, since the draining pipe is square at the outer side and circular at the inner side, when viewed along the axial direction of the draining pipe, it will not roll along the circumferential direction when placed on a flat surface. Moreover, the draining pipe, which is square at the outer side and circular at the inner side, is more stable in structure.

The draining pipe shown in FIGS. 7A to 7C also has a variant. For example, in the wavy section of the ribs 12 in a circumferential direction of the draining pipe, the wave amplitude thereof decreases gradually from the inner side to the outer side of the draining pipe, along the radial direction of the draining pipe, and decreases to 0 at the outer side of the draining pipe, so that the outer sidewall surface of the ribs 12 is rectangular-cylinder shaped, and the inner sidewall surface is wavy on a cylindrical surface.

As shown in FIGS. 8A to 8C, in another embodiment of the draining pipe, a plurality of ribs 12, composing a tubular permeable wall body 11 of the draining pipe, are connected into a whole by heads and tails in a spiral shape. Please referring to FIGS. 8B and 8C, when viewed along an axial direction of the draining pipe, the draining pipe is triangular. Besides, a cross section of the ribs 12 is wavy in a circumferential direction of the draining pipe, and has alternating wave crest parts and wave trough parts at an outer side of the circumferential direction, wherein the wave crest part of one rib, among two adjacent ribs, is opposite to the wave trough part of the other. The wave amplitude of the wavy section decreases gradually from the outer side to the inner side of the draining pipe, along a radial direction of the draining pipe, and decreases to 0 at the inner side of the draining pipe, so that the inner sidewall surface of the plurality of ribs 12 is triangular-cylinder shaped, and the outer sidewall surface is wavy on the surface of the triangular-cylinder. The draining pipe, arranged in this implementation manner, can also reach the anti-blocking effect in the draining pipe, as that shown in FIG. 1A to FIG. 1C. Meanwhile, since the draining pipe is triangular when viewed along the axial direction of the draining pipe, the compression strength of the draining pipe is stronger, and when under an external force in a radial direction of the draining pipe, the draining pipe is even not easy to deform. Meanwhile, when placed on a flat surface, the draining pipe will not roll along the circumferential direction.

The draining pipe shown in FIGS. 8A to 8C also has a variant. For example, in the wavy section of the ribs 12 in a circumferential direction of the draining pipe, the wave amplitude thereof decreases gradually from the inner side to the outer side of the draining pipe, along the radial direction of the draining pipe, and decreases to 0 at the outer side of the draining pipe, so that the outer sidewall surface of the ribs 12 is triangular-cylinder shaped, and the inner sidewall surface is wavy on the triangular-cylinder.

Figure 9A:
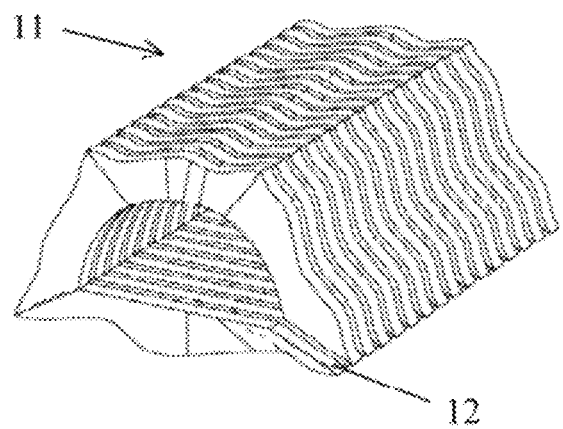
FIG. 9A is a three-dimensional schematic diagram of another embodiment of the draining pipe or the draining ditch.
Figure 9B:
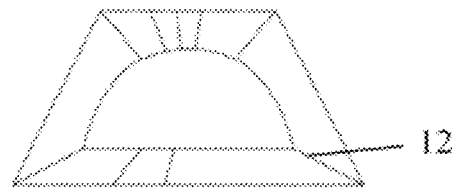
FIG. 9B is a side view of the draining pipe or the draining ditch shown in FIG. 9A.
Figure 9C:
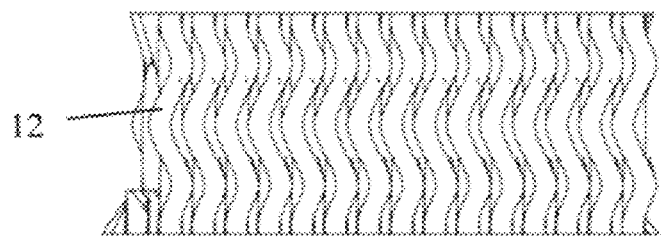
FIG. 9C is an elevation view of the draining pipe or the draining ditch shown in FIG. 9A.

As shown in FIGS. 9A to 9C, in another embodiment of the draining pipe, a plurality of ribs 12, composing a tubular permeable wall body 11 of the draining pipe, are connected into a whole by heads and tails in a spiral shape. Please referring to FIGS. 9B and 9C, when viewed along an axial direction of the draining pipe, the draining pipe is trapezoidal. Besides, a cross section of the ribs 12 is wavy in a circumferential direction of the draining pipe, and has alternating wave crest parts and wave trough parts at an outer side of the circumferential direction, wherein the wave crest part of one rib, among two adjacent ribs, is opposite to the wave trough part of the other. The wave amplitude of the wavy section decreases gradually from the outer side to the inner side of the draining pipe, along a radial direction of the draining pipe, and decreases to 0 at the inner side of the draining pipe, so that the inner sidewall surface of the plurality of ribs 12 is trapezoidal-cylinder shaped, and the outer sidewall surface is wavy on the trapezoidal-cylinder. The draining pipe, arranged in this implementation manner, can also reach the anti-blocking effect in the draining pipe, as that shown in FIG. 1A to FIG. 1C. Meanwhile, when placed on a flat surface, the draining pipe will not roll along the circumferential direction.

The draining pipe shown in FIGS. 9A to 9C also has a variant. For example, in the wavy section of the ribs 12 in a circumferential direction of the draining pipe, the wave amplitude thereof decreases gradually from the inner side to the outer side of the draining pipe, along the radial direction of the draining pipe, and decreases to 0 at the outer side of the draining pipe, so that the outer sidewall surface of the ribs 12 is trapezoidal-cylinder shaped, and the inner sidewall surface is wavy on the trapezoidal-cylinder.

Figure 10:
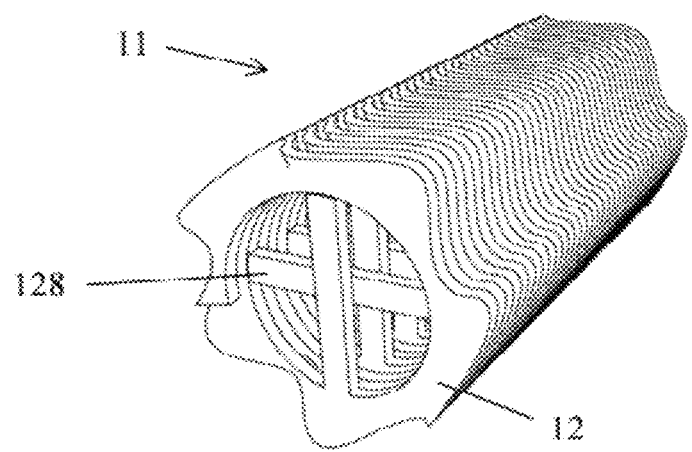
FIG. 10 is a three-dimensional schematic diagram of another embodiment of the draining pipe or the draining ditch.

Please referring to FIG. 10 right along, two opposite ends of any adjacent ribs of the plurality of ribs 12 of the draining pipe are connected by at least one reinforcing rib 128, so that when the draining pipe is under an external force in a radial direction, the pipe body of the draining pipe will still not deform. In some embodiments, reinforcing ribs 128 may be arranged on any two ribs 12 in an angled manner, or in a parallel staggered manner.

In some embodiments, at least a part of the inner side or the outer side of the plurality of ribs 12 are connected by the reinforcing ribs, further enhancing the compression strength of the draining pipe.

In some embodiments, when viewed along the axial direction of the draining pipe, the outer profile of the draining pipe may be, but not limited to, a suitable shape such as a circle, a polygon or a sector, etc., while the inner profile of the draining pipe may be, but not limited to, a suitable shape such as a circle, a polygon or a sector, etc., so as to meet the requirements of compression and draining amount, etc., under different construction conditions.

In some embodiments, at least a part of the plurality of ribs 12 of the draining pipe is provided with a hole or a groove to form an additional draining channel, further improving the drainage efficiency. In one or more embodiments, an accessory such as a steel wire, a steel rod, a plastic wire or a plastic rod, etc., can be added into the provided hole or groove to achieve the effect of increasing the strength of the draining pipe.

In some embodiments, the draining pipe is also provided with a filter layer. The filter layer can prevent sediment, debris, etc. from entering the pipe body while allowing the drained water to enter the draining pipe, thereby further preventing a blockage phenomenon in the draining pipe. In one or more embodiments, the filter layer may be composed of, but is not limited to, a wrapping material such as a silk, a cloth, a membrane, etc., and the mixture thereof, or it may also be an inverted filter layer.

In some embodiments, the plurality of ribs 12 may be made in a form of triangular, quadrilateral, double-wavy, spiral or circular ribs, etc.

In some embodiments, the plurality of ribs 12 are also provided with a convex and/or concave stripe on the outer surface of the draining pipe, which can be used to increase a friction force on the outer surface of the draining pipe, prevent skid, as well as beautify the outer surface of the draining pipe.

The plurality of embodiments of the draining device, shown in FIG. 1A to FIG. 10, can also be used as a plurality of draining ditches, which have the same features as the draining pipes in the above embodiments, and can be used for asphalt surface drainage in a road and a bridge, interlayer water drainage, for replacing the conventional drainage by an open ditch. Meanwhile, these embodiments can also be used as a roadside slope draining ditch of a landscape garden; a draining ditch of a railway station, an airport, or a square, etc.; a road horizontal draining ditch; a draining ditch of a waiting area such as a bus station and taxi point, etc.; a draining ditch of a swimming pool; a draining ditch of a kitchen and a bathroom; an underground draining ditch; an edge draining ditch of a roof garden, a green draining ditch of a roof board of an underground garage, and other areas that need a permeating and draining ditch. Meanwhile, when the plurality of draining ditches are placed, part of them can be buried under the road surface, while one surface thereof can be used as a draining ditch cover plate that is exposed on the road surface. As a result, there is no need to add an additional cover plate, saving the cost and avoids a cumbersome operation caused by a secondary installation.

When the plurality of embodiments of the draining device shown in FIG. 1a to FIG. 10 are further used as a draining ditch, there are further usages as the following.

When the plurality of embodiments of the draining device shown in FIG. 5A to FIG. 5C are used as a plurality of draining ditches, the draining ditch is fan-shaped when viewed along an axial direction of the draining ditch. When placed, an arc side thereof can be exposed on the road surface as a cover plate of the draining ditch. When used in an underground garage, the arc side of the draining ditch can be exposed on the road surface, and used as a deceleration belt of the underground garage, so that the draining ditch and the deceleration belt can be combined into one, which not only simplifies the construction process, but also saves the construction cost.

When the plurality of embodiments of the draining device shown in FIG. 8A to FIG. 9C are used as a plurality of draining ditches, the draining ditch is upside down when installed on the road surface.

FIG. 11A to FIG. 11C show another embodiment, in which the draining device is a draining ditch. A plurality of ribs 12, composing the permeable wall body 11 of the draining ditch, are U-shaped, having two side-arms 124 and a bottom 125. Please referring to FIG. 11B for details, the adjacent ribs of the plurality of ribs 12 are alternately connected at top ends of the two side-arms 124 and the bottom 125, forming a continuous square wave shape. Please referring to FIG. 11C for details, a cross section of the ribs 12 is wavy in a length extension direction of the draining ditch, so that the bottom 125 has a wave shape. Meanwhile, the outer side of the bottom 125 of the draining ditch has alternating wave crest parts and wave trough parts, wherein the wave crest part of one rib, among two adjacent ribs, is opposite to the wave trough part of the other. The wave amplitude of the wavy section decreases gradually from the outer side to the inner side of the bottom 125 of the draining ditch, along a vertical direction of the bottom 125 of the draining ditch, and decreases to 0 at the inner side of the bottom 125 of the draining ditch. The gaps on the surface of the bottom 125 of the draining ditch are shielded by the inner and outer surfaces of the plurality of ribs 12, so as to reduce the debris that enter into the draining ditch from the outside, and prevent the blockage inside the draining ditch. Meanwhile, any adjacent ribs of the plurality of ribs 12 are connected in an elastically expandable manner to make the draining ditch easy to expand and bend, which may also reach the effect of more easily fitting with the construction direction. The draining ditch shown in FIG. 11A to FIG. 11C also has a variant. For example, the wave amplitude of the wavy section decreases gradually from the inner side to the outer side of the bottom 125 of the draining ditch, along a vertical direction of the bottom 125 of the draining ditch, and decreases to 0 at the outer side of the bottom 125 of the draining ditch. In one embodiment that is not shown in a figure, the centre of the bottom 125 of the draining ditch shown in FIG. 11A to FIG. 11C are further provided with at least one reinforcing rib, protruding upward from the bottom 125 to be flush with the two side-arms 124, for strengthening the internal structural strength of the draining ditch.

FIG. 11D shows a variant of the draining device shown in FIG. 11a to FIG. 11C. As shown in FIG. 11D, a plurality of ribs 12, composing the permeable wall body 11 of the draining ditch, are U-shaped, having two side-arms 124 and a bottom 125. Adjacent ribs of the plurality of ribs 12 are alternately connected between the two side-arms 124.

The draining devices shown in FIG. 1A to FIG. 11D also have different variants. For example, the wave amplitude variation of the wavy sections of the plurality of ribs 12 of the permeable wall bodies 11 is nonlinearly, so that the plurality of ribs 12 can have the wave shapes for shielding each other at both inner sides and outer sides of these draining devices.

FIG. 12A to FIG. 15B show a plurality of embodiments, in which the draining device is an anti-blocking and water-permeating collecting well. The embodiments are mainly used as a water collector for asphalt surface drainage in a road and a bridge, interlayer water drainage, and other occasions that need a draining ditch with a water collector or a discharger, such as using with a roadside slope draining ditch of a landscape garden; using with a draining ditch of a railway station, an airport, or a square, etc.; using with a road horizontal draining ditch; using with a draining ditch of a waiting area such as a bus station and taxi point, etc.; using with a draining ditch of a swimming pool; using with a draining ditch of a kitchen and a bathroom; using with a draining of an underground garage; using with an edge draining ditch of a roof garden, and a green draining ditch of a roof board of an underground garage, etc., so as to make the interlayer water of the pavement drain into the collecting well, as well as discharge the rainwater of the road pavement and the bridge pavement.

Please referring to FIGS. 12A and 12B, the anti-blocking and water-permeating collecting well is square. The collecting well comprise four permeable wall bodies 21, and a wellhead 20 that is surrounded by the four permeable wall bodies 21. The wellhead 20 is used to receive the external discharge water of the collecting well. The four permeable wall bodies 21 form four surrounding walls of the collecting well. The permeable wall body 21 also comprises a plurality of ribs 22. The cross sections of the ribs 22 are wavy, in a circumferential direction of the well walls of the collecting well, and have alternating wave crest parts and wave trough parts at the outer side of the wall of the collecting well, wherein the wave crest part of one rib, among two adjacent ribs, is opposite to the wave trough part of the other. The wave amplitude of the wavy section of the rib 22 decreases gradually from the outer side to the inner side of the wall of the collecting well, along a thickness direction of the wall of the collecting well, and decreases to 0 at the inner side of the wall of the collecting well. A draining pipe is also connected to the bottom of the collecting well, for discharging the water in the collecting well. The gaps on the surface of the wall of the collecting well are shielded by the inner and outer surfaces of the plurality of ribs 22, so as to reduce the debris that enter into the draining ditch from the outside, for preventing the blockage inside the draining ditch, as well as allowing the interlayer water under the pavement surface to flow into the collecting well through the gaps on the wall of the collecting well. Additionally, compared with the conventional way of opening holes on the well wall, the structure of the collecting well in this embodiment is more stable. Meanwhile, a rectangular collecting well can be better combined with a circular draining pipe.

The anti-blocking and water-permeating collecting well shown in FIGS. 12A and 12B also has a variant. For example, in the wavy section of the ribs 22 in a thickness direction of the wall of the collecting well, the wave amplitude thereof decreases gradually from the inner side to the outer side of the collecting well, along the radial direction of the collecting well, and decreases to 0 at the outer side of the collecting well.

The anti-blocking and water-permeating collecting well shown in FIGS. 12A and 12B also has a variant in the shape of the collecting well. As shown in FIGS. 13A and 13B, the anti-blocking and water-permeating collecting well is circular, and the permeable wall body 21 is the annular wall of the collecting well.

The anti-blocking and water-permeating collecting well shown in FIGS. 12A and 12B also has another variant in the shape of the collecting well. As shown in FIGS. 14A and 14B, the anti-blocking and water-permeating collecting well is a water collecting box. The water collecting box comprises four sidewalls, and an opening 24 surrounded by the sidewalls, wherein three sidewalls of the collecting box comprise a plurality of ribs 22, and the three sides respectively form the permeable wall body 21 of the collecting box. The water collecting box shown in FIGS. 14A and 14B is more suitable for a bridge, with a plurality of lanes, in shape. As shown in FIGS. 15A and 15B, the anti-blocking and water-permeating collecting well is an L-shaped water collecting box. The water collecting box is L-shaped from its side view. A plurality of ribs 22 are arranged on three sidewalls of the water collecting box, and the three side walls respectively form the permeable wall body 21 of the water collecting box. The L-shaped water collecting box is more suitable for an urban viaduct.

In some embodiments, the wave amplitude variation of a wavy section of the plurality of ribs 22 in the permeable wall body 21 of the anti-blocking water-permeating collecting well is nonlinear, so that the plurality of ribs 22 can have the wave shapes for shielding each other at both the inner side and the outer side of the collecting well.

In one embodiment, the anti-blocking and water-permeating collecting well is made of plastic material, and the molding method thereof may comprise, but is not limited to, a suitable plastic molding process such as an injection molding process, a compression molding process, etc. When a plastic collecting well is used in asphalt pavement, the plastic collecting well can be reused as a part of asphalt mixture when the asphalt surface is damaged and needs milling. Meanwhile, a degradable plastic may also be used in other areas that need drainage, making it greener.

In some embodiments, the plurality of ribs 22 of the anti-blocking and water-permeating collecting well are connected by reinforcing ribs in the anti-blocking and water-permeating collecting well, so that when the collecting well is under an external force in a radial direction, the water collecting well will not deform.

In some embodiments, at least a part of the plurality of ribs 22 of the anti-blocking and water-permeating collecting well is provided with a hole or a groove to form an additional draining channel, further improving the drainage efficiency. In one or more embodiments, an accessory such as a steel wire, a steel rod, a plastic wire or a plastic rod may be added into the provided hole or groove to achieve the effect of increasing the strength of the anti-blocking and water-permeating collecting well.

In some embodiments, the anti-blocking and water-permeating collecting well is also provided with a filter layer. The filter layer may allow the drained water to enter into the collecting well, while preventing the sediment and debris from entering into the collecting well, so as to further prevent the pipe blocking phenomenon inside the anti-blocking and water-permeating collecting well. In one or more embodiments, the filter layer may be, but is not limited to, composed of a wrapping material such as a silk, a cloth, a membrane, etc. and the mixture thereof, or it may also be an inverted filter layer.

In some embodiments, the plurality of ribs 22 may be made in a form of triangle, quadrilateral, double wavy, spiral or circular ribs, etc.

In some embodiments, the plurality of ribs 22 are also provided with a convex and/or concave stripe on the outer surface of the anti-blocking and water-permeating collecting well, which can be used to increase a friction force on the outer surface of the anti-blocking and water-permeating collecting well, prevent skid, as well as beautify the outer surface of the anti-blocking and water-permeating collecting well.

FIGS. 16 to 21 show a plurality of embodiments in which the draining device is an anti-blocking well cover, which is mainly used in a place where a draining well cover or a cover plate is needed, as an anti-blocking cover plate on a draining ditch, a collecting well, a draining hole, a pool side ditch, a bathroom draining ditch and roadside ditch.

Please referring to FIG. 16, in one embodiment, the anti-blocking well cover is composed of a plurality of ribs 32. The plurality of ribs 32 extend radially from the centre of the anti-blocking well cover to the periphery. The plurality of ribs 32 compose the permeable wall body 31 of the anti-blocking well. A cross section of the ribs 32 on the surface of the anti-blocking well is wavy, and has alternating wave crest parts and wave trough parts on either side of the well cover, wherein the wave crest part of one rib, among two adjacent ribs, is opposite to the wave trough part of the other. The wave amplitude of the wavy section decreases gradually from one side to another side of the anti-blocking well cover, along a thickness direction of the anti-blocking well cover, and decreases to 0 at one side of the anti-blocking well cover. Therefore, the gaps on the surface of the anti-blocking well cover are shielded by the inner and outer surfaces of the plurality of ribs 32, so as to reduce the debris and other items, such as a traffic card, a cell phone, etc., which enter into the well cover from the outer side of the draining ditch, for preventing the blockage inside the well cover, as well as preventing the items from falling in. Meanwhile, the plurality of wave shapes on the surface of the well cover makes the well cover more stable and compressive. Additionally, both the wavy surface and the non-wavy surface of the well cover can be used as a side facing the road, so that a user can choose which side to use according to the specific scene.

Figure 18:
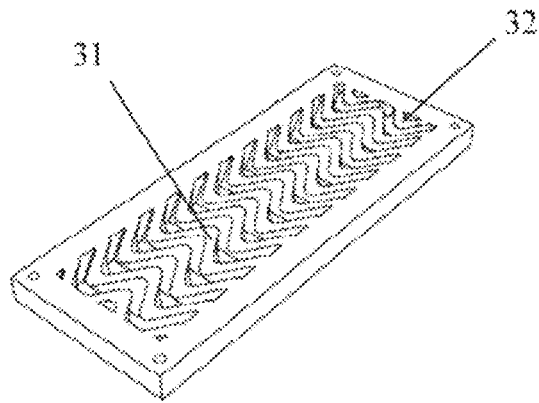
Figure 19:
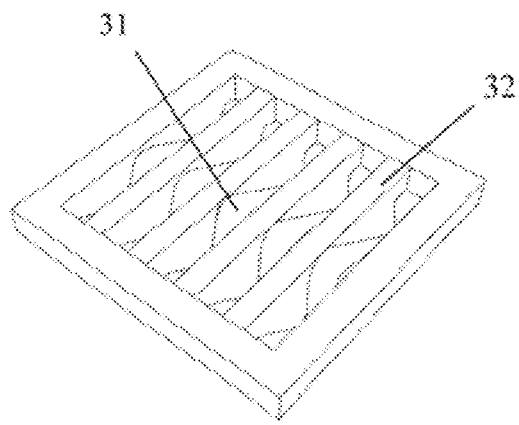
Figure 20:
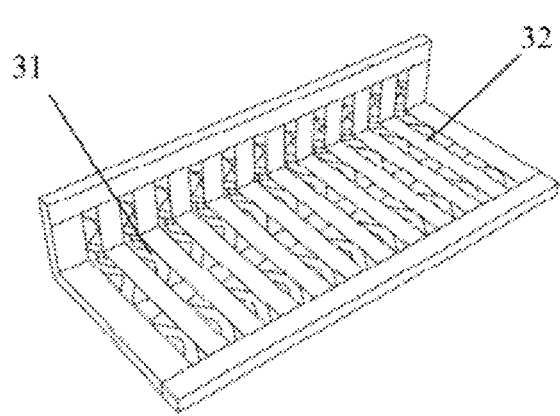

The anti-blocking well cover shown in FIG. 16 also has a variant in the arrangement of the ribs 32. As shown in FIG. 17, the plurality of ribs 32 extend between two opposite sides of the well cover. The anti-blocking well cover is composed of the plurality of ribs 32, and the adjacent ribs 32 of the plurality of ribs 32 are alternately connected at both ends of the well cover. The anti-blocking well cover shown in FIG. 17 also has a variant in appearance. As shown in FIG. 18 to FIG. 20, the anti-blocking well cover may be rectangular, square or L-shaped for meeting the needs of various construction occasions. Please referring to FIG. 20 for details, the anti-blocking well cover is L-shaped. When applied to a bridge with an anti-collision wall, one of the mutually perpendicular cover bodies may fit the anti-collision wall, and the other one may fit the road. The plurality of ribs 32 of the anti-blocking well cover may, but are not limited to, be arranged in a grid shaped, honeycomb shaped and other suitable shaped distribution in the anti-blocking well cover.

Figure 21:
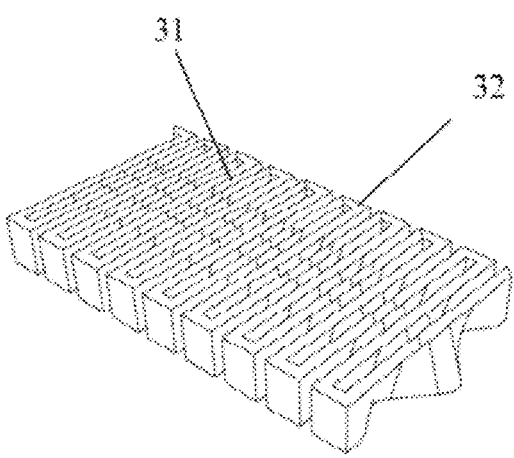

Please referring to FIG. 21, in one embodiment, a cross section of the plurality of ribs 32 is wavy in a length extension direction of the anti-blocking well cover, and has alternating wave crest parts and wave trough parts on either side of the well cover, wherein the wave crest part of one rib, among two adjacent ribs, is opposite to the wave trough part of the other. The wave amplitude of the wavy section decreases gradually from one side to another side of the anti-blocking well cover, along a thickness direction of the anti-blocking well cover, and decreases to 0 at one side of the anti-blocking well cover. Therefore, the same effect of preventing blockage and preventing the items from falling in, as the anti-blocking well cover shown in FIG. 16 to FIG. 20, may be achieved. Meanwhile, any adjacent ribs of the plurality of ribs 12 are connected in an elastically expandable manner to make the anti-blocking well cover easy to expand and bend, so that the anti-blocking well cover can fit the construction direction better and be applied to the draining devices with various shapes, preventing garbage and other debris from accumulating in the gap between the well cover and the road. In some embodiments, the plurality of ribs 32 of a plurality of well covers can be connected by welding, bonding or buckles.

In one embodiment, the anti-blocking well cover is made of plastic material, and the molding method thereof may comprise, but is not limited to, a suitable plastic molding process such as an injection molding process, a compression molding process, etc. When a plastic well cover is used in asphalt pavement, the well cover can be reused as a part of asphalt mixture when the asphalt surface is damaged and needs milling. Meanwhile, a degradable plastic may also be used in other areas that need drainage, making it greener.

In some embodiments, the plurality of ribs 32 of the anti-blocking well cover are connected by reinforcing ribs in the anti-blocking well cover, so that when the well cover is under an external force in a radial direction, the anti-blocking well cover will not deform.

In some embodiments, at least a part of the plurality of ribs 22 of the anti-blocking well cover is provided with a hole or a groove to form an additional draining channel, further improving the drainage efficiency. In one or more embodiments, an accessory such as a steel wire, a steel rod, a plastic wire or a plastic rod may be added into the provided hole or groove to achieve the effect of increasing the strength of the anti-blocking well cover.

In some embodiments, the anti-blocking well cover is also provided with a filter layer. The filter layer may allow the drained water to enter into the anti-blocking well cover, while preventing the sediment and debris from entering into the well cover, so as to further prevent the pipe blocking phenomenon inside the anti-blocking well cover. In one or more embodiments, the filter layer may be, but is not limited to, composed of a wrapping material such as a silk, a cloth, a membrane, etc. and the mixture thereof, or it may also be an inverted filter layer.

In some embodiments, the plurality of ribs 32 may be made in a form of triangle, quadrilateral, double wavy, spiral or circular ribs, etc.

In some embodiments, the plurality of ribs 32 are also provided with a convex and/or concave stripe on the outer surface of the anti-blocking well cover, which can be used to increase a friction force on the outer surface of the anti-blocking well cover, prevent skid, as well as beautify the outer surface of the anti-blocking well cover.

In some embodiments, the wave amplitude variation of a wavy section of the plurality of ribs 32 in the permeable wall body 31 of the anti-blocking well cover is nonlinearly, so that the plurality of ribs 32 can have the wave shapes for shielding each other at both the inner side and the outer side of the collecting well.

Although the present invention is disclosed in a better embodiment as above, it is not intended to limit the present invention. Any person skilled in the art can make possible changes and modifications without departing from the spirit and scope of the invention. Therefore, all modifications, equivalent variations and embellishments made to the above embodiments according to the technical essence of the present invention, without departing from the content of the technical proposal of the present invention, will fall into the scope of protection defined by the claims of the present invention.

The invention claimed is:

1. A draining device, comprising a permeable wall body that comprises a plurality of ribs, wherein a cross section of the ribs in a first direction is in a wave shape, and a wave amplitude of the cross section gradually changes, from a first side to a second side, in a second direction, so that the ribs have alternating wave crest parts and wave trough parts at either side of the first direction, the wave crest part of one rib, among two adjacent ribs is opposite to the wave trough part of the other, the first direction intersects the second direction, and the second direction is a thickness direction of the permeable wall body.

2. The draining device of claim 1, wherein a surface of the one of the adjacent ribs, at the first side, overlaps a surface of the other of the adjacent ribs, at the second side, in an orthographic projection of the permeable wall body along a vertical direction thereof.

3. The draining device of claim 1, wherein the wave amplitude of a wall surface at the first side, or a wall surface at the second side, is 0.

4. The draining device of claim 1, wherein the draining device is a draining pipe or a draining ditch, the draining pipe or the draining ditch is tubular, the first direction is a circumferential direction of the draining pipe or the draining ditch, and the second direction is a radial direction of the draining pipe or the draining ditch.

5. The draining device of claim 4, wherein the permeable wall body of the draining pipe or the draining ditch is composed of the plurality of ribs, connected into a whole by heads and tails in a spiral shape, an inner side of the draining pipe or the draining ditch is the first side, and an outer side of the draining pipe or the draining ditch is the second side.

6. The draining device of claim 5, wherein when viewed from an axial direction, the draining device is divided into two parts in up and down directions, each of which has a linear sidewall, the wave amplitude of the outer surface of the linear sidewall of one part, among the two parts, is 0, and the wave amplitude of the outer surface of the linear sidewall of the other part, among the two parts, is largest during the gradual changing process.

7. The draining device of claim 5, wherein two opposite ends of any adjacent ribs are connected by at least one reinforcing rib.

8. The draining device of claim 5, wherein the reinforcing ribs are arranged in a manner such that any one of the reinforcing rib is arranged relative to its adjacent reinforcing rib in an angled manner or a parallel staggered manner, in the draining device.

9. The draining device of claim 5, wherein any adjacent ribs of the plurality of ribs are connected in an elastically expandable manner to make the draining pipe or the draining ditch easy to expand and bend.

10. The draining device of claim 5, wherein when viewed from an axial direction of the draining pipe or the draining ditch, the draining pipe or the draining ditch is circular.

11. The draining device of claim 5, wherein an inner sidewall surface of the plurality of ribs is cylindrical, and an outer sidewall surface is wavy on the cylinder surface.

12. The draining device of claim 5, wherein an outer sidewall surface of the plurality of ribs is cylindrical, and an inner sidewall surface is wavy on the cylinder surface.

13. The draining device of claim 5, wherein an inner sidewall surface of the draining pipe or the draining ditch is rectangular-cylinder shaped, and an outer sidewall surface is wavy on the rectangular-cylinder surface.

14. The draining device of claim 5, wherein an outer sidewall surface of the draining pipe or the draining ditch is rectangular-cylinder shaped, and an inner sidewall surface is wavy on the rectangular-cylinder surface.

15. The draining device of claim 1, wherein the draining device is a draining ditch, the ribs are U-shaped, having two side-arms and a bottom, the adjacent ribs of the plurality of ribs are alternately connected at top ends of the two side-arms and the bottom, or at opposite side-arms, the bottom of the rib has the wave shape, the first direction is a length extension direction of the draining ditch; any adjacent ribs of the plurality of ribs are connected in an elastically expandable manner to make the draining ditch easy to expand and bend.

16. The draining device of claim 1, wherein the draining device is an anti-blocking and water-permeating collecting well, a well wall of the anti-blocking and water-permeating collecting well comprises the permeable wall body.

17. The draining device of claim 1, wherein the draining device is an anti-blocking well cover.

18. The draining device of claim 17, wherein the anti-blocking well cover is composed of the plurality of ribs, the adjacent ribs of the plurality of ribs are alternately connected at both ends, the first direction is a length extension direction of the anti-blocking well cover; any adjacent ribs of the plurality of ribs are connected in an elastically expandable manner to make the anti-blocking well cover easy to expand and bend.

19. The draining device of claim 1, wherein the first side or the second side of at least a part of the plurality of ribs is connected by a reinforcing rib.

20. The draining device of claim 1, wherein at least a part of the plurality of ribs is provided with a hole or a groove to form an additional draining channel.

* * * * *